United States Patent
Amann et al.

(10) Patent No.: US 8,696,323 B2
(45) Date of Patent: Apr. 15, 2014

(54) METHOD FOR DETERMINING THE DELIVERY RATE OF A LIQUID CONVEYING DEVICE

(75) Inventors: Martin Amann, Frastanz (AT); Norbert Krimbacher, Satteins (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 176 days.

(21) Appl. No.: 13/406,293

(22) Filed: Feb. 27, 2012

(65) Prior Publication Data

US 2012/0216609 A1 Aug. 30, 2012

(30) Foreign Application Priority Data

Feb. 28, 2011 (DE) .......................... 10 2011 012 590

(51) Int. Cl.
*F04B 49/00* (2006.01)

(52) U.S. Cl.
USPC ............................................................ 417/46

(58) Field of Classification Search
USPC .................... 417/46, 44.2, 63, 44.1
See application file for complete search history.

(56) References Cited

U.S. PATENT DOCUMENTS

| | | | |
|---|---|---|---|
| 4,183,243 A | | 1/1980 | Patterson et al. |
| 5,125,801 A | * | 6/1992 | Nabity et al. ............. 417/44.1 |
| 5,332,366 A | * | 7/1994 | Anderson ................. 417/63 |
| 5,360,320 A | * | 11/1994 | Jameson et al. ........... 417/4 |
| 5,401,139 A | * | 3/1995 | Nabity et al. ............. 417/63 |
| 5,997,778 A | | 12/1999 | Bulgrin |
| 6,068,448 A | * | 5/2000 | Muratsubaki et al. ....... 417/44.2 |
| 6,375,432 B1 | | 4/2002 | Krasny et al. |
| 7,127,952 B2 | * | 10/2006 | Bitto et al. ............ 73/861.355 |
| 2012/0167697 A1 | * | 7/2012 | Rieder et al. ............ 73/861.357 |

FOREIGN PATENT DOCUMENTS

| | | |
|---|---|---|
| DE | 4029616 A1 | 3/1992 |
| DE | 4035518 A1 | 5/1992 |
| DE | 4206576 A1 | 9/1993 |
| DE | 10350067 A1 | 5/2004 |
| DE | 102008017961 A1 | 10/2009 |
| EP | 0562398 A1 | 9/1993 |
| EP | 1306550 A1 | 5/2003 |

OTHER PUBLICATIONS

ISA European Patent Office, Search Report of EP12000812, Feb. 28, 2013, Germany, 5 pages.

* cited by examiner

*Primary Examiner* — Jewel V Thompson
(74) *Attorney, Agent, or Firm* — Alleman Hall McCoy Russell & Tuttle LLP

(57) ABSTRACT

The present disclosure relates to a method for determining the delivery rate of a liquid conveying device, in particular a concrete pump, wherein on the basis of measured values concerning the pressure of the liquid the number of the pump strokes of the concrete conveying device is determined, in particular substantially calculated, by series-connection of a plurality of filters with adaptive filter length and variable detection limits. Furthermore, the present disclosure relates to a liquid conveying device and to a construction vehicle with a liquid conveying device.

11 Claims, 4 Drawing Sheets

METHOD FOR DETERMINING THE DELIVERY RATE OF A LIQUID CONVEYING DEVICE

CROSS REFERENCE TO RELATED APPLICATION

This application claims priority to German Patent Application No. 10 2011 012 590.6, entitled "Method for Determining the Delivery Rate of a Liquid Conveying Means", filed Feb. 28, 2011, which is hereby incorporated by reference in its entirety for all purposes.

TECHNICAL FIELD

The present disclosure relates to a method for determining the delivery rate of a liquid conveying device, in particular of a concrete pump, to a liquid conveying device and to a construction vehicle with a liquid conveying device.

BACKGROUND AND SUMMARY

In operation of a concrete pump on a construction site it is necessary to be able to determine the delivered quantity of the concrete substantially immediately and without time delay. In various types of use, the delivery rate is a relevant quantity and must be detected.

For this purpose, it has so far been provided that for example the driver of a construction vehicle with a concrete pump, which in practice constitutes a piston pump, specifies the quantity to be delivered per pump stroke of the concrete pump. On the basis of this specification and of the pump strokes performed, the delivered quantity of the concrete can then be calculated.

However, it turns out to be problematic that the determination of the pump strokes performed cannot easily be effected. This requires a high technical effort, since a detection of the pump strokes for example is effected directly at the pump via limit switches. However, this necessitates e.g. an expensive cable arrangement from the pump to the machine processing the concrete or some other kind of signal transmission e.g. via a radio link. Mounting a limit switch on the different types of pumps, however, is problematic in particular in mobile concrete pumps.

Therefore, it is the object of the present disclosure to develop a method as mentioned above in an advantageous way, in particular to the effect that a safe and simple determination of the delivery rate of the liquid can be achieved.

In accordance with the present disclosure, this object is solved, in one example, by a a method for determining the delivery rate of a liquid conveying device, (e.g., at least one piston pump). On the basis of measured values concerning the pressure of the liquid in the liquid conveying device, the number of the pump strokes of the liquid conveying device is determined, in particular substantially calculated, by series connection of a plurality of filters with adaptive filter length and variable detection limits. The filter may be a digital filter (discrete filter) implemented in a digital electronic controller receiving the measured values, such as via sensors coupled to the piston pump. The determined delivery rate may be outputted and/or used to determine the delivery rate of the liquid conveying device, which can then be communicated and/or displayed via a display device.

In this method it is in particularly advantageous that the time delay is small with regard to the process, i.e., the determination of the delivery rate of a liquid conveying device.

The liquid conveying device in particular can be a concrete pump, wherein this concrete pump can be arranged for example on a construction vehicle or some other mobile base. Such liquid conveying device in particular includes a telescopable or foldable boom on which a concrete delivery hose and/or tube or a combination of a concrete delivery hose and a concrete delivery tube is arranged, by which the liquid concrete can be delivered to the corresponding unloading location on a construction site. By determining measured values concerning the pressure, in particular concerning the delivery pressure, it is possible to advantageously indirectly, but exactly determine the number of the pump strokes of the piston pump serving as liquid conveying device, whereby the quantity of liquid delivered by device of the liquid conveying device thereby can be inferred or calculated. Accordingly, this is an indirect delivery rate measurement of the liquid which is delivered by device of the liquid conveying device.

Possible methods for the analysis of measurement data such as the use of mean value filters for eliminating peaks or for generating auxiliary signals, offset elimination by high-pass filtering, discrete Fourier transformation, offset removal by signal less averaged signal (low pass), time derivation (difference quotient), minima and maxima determination within a rectangular window, envelopes, for example multiplicative increase or reduction, cross-correlation or an adaptive window length for example of the form $$N = \frac{N_{old} + N_{new}}{2}$$

are not sufficiently suited as such to solve the object with the given object. In liquid conveying devices, which deliver liquids such as concrete over in part considerably delivery distances, it can occur that the determined measured values concerning the pressure on the whole provide a signal or signal pattern which does not reveal any pressure fluctuations, although concrete definitely is pumped through the liquid conveying device. Only a combination of averaging and adaptive window or filter length and variable detection limits allows an evaluation of the measured values concerning the pressure with sufficient accuracy to the effect that the performed number of pump strokes of the piston pump and hence the delivery rate can be determined.

The calculation of the number of pump strokes and based thereon the determination of the concrete delivery rate with reference to the known or specified delivery rate of the liquid per pump stroke thus is effected easily, accurately and so fast that the determination of the delivery rate of the liquid conveying device substantially is possible without time delay. For example, the calculation is effected by an evaluation and/or calculation device, such as an electronic controller, which for example can be part of the control and/or regulation unit of the liquid conveying device.

It is furthermore conceivable that the determination of the delivery rate is effected independent of the DC component of the measured value and/or with highly noisy and/or disturbed and/or shifted measured values and/or without prior knowledge of and/or reference to the current pump frequency of the liquid conveying device.

Furthermore, it can be provided that at least three filters are provided and/or that the filters are moving-averages filters (MA filters), by which an evaluation of the individual filtered signals is effected and the dominant signal frequency is converted into a square-wave signal, so that the detection of a pump stroke of the liquid conveying device can be effected in the form of a flank detection.

In addition, it is possible that at least one first MA filter is a mean value filter over at least five measured (e.g., digitally sampled) values for eliminating peaks and/or that beside the at least one first MA filter an at least second and an at least third MA filter is provided, wherein the third MA filter is a mean value filter whose filter length is dependent on the pump frequency of the liquid conveying device and the second MA filter is a mean value filter whose filter length is half as long as the third MA filter.

It is furthermore conceivable that when evaluating the measured values at least one mean fade-out time is formed, wherein the limits for the mean fade-out time are dependent on the pump frequency of the liquid conveying device.

In addition, it can be provided that a distance time is provided, which describes the period between two ascending flanks of a square-wave signal, wherein a pressure increase only is detected after 75% of a mean distance time and 95% of the minimum fade-out time and/or that a pressure decrease only is detected after 75% of the mean fade-out time. The aforementioned values are approximate values which serve as reference point for the values to be adjusted.

Furthermore, the present disclosure relates to a liquid conveying device. Accordingly, it is provided that a liquid conveying device is provided with at least one device for determining the delivery rate of the liquid conveying device, wherein on the basis of measured values concerning the pressure of the concrete in the liquid conveying device the number of the pump strokes of the liquid conveying device can be determined by series connection of a plurality of filters with adaptive filter length and variable detection limits, wherein by the liquid conveying device, which in particular includes a corresponding evaluation and/or calculation device, such as an electronic controller, the methods described herein can be carried out.

When carrying out the method by via the liquid conveying device, the liquid conveying device can be designed such that the method substantially can be carried out by the evaluation and/or calculation device of the liquid conveying device.

In particular, the liquid conveying device can have the aforementioned liquid conveying device features described in connection with the method for determining the delivery rate of the liquid conveying device.

In addition, the present disclosure relates to a construction vehicle with at least one liquid conveying device as described herein.

Further details and advantages of the present disclosure will now be explained in detail with reference to an exemplary embodiment illustrated in the drawings.

DETAILED DESCRIPTION

Figure 1:
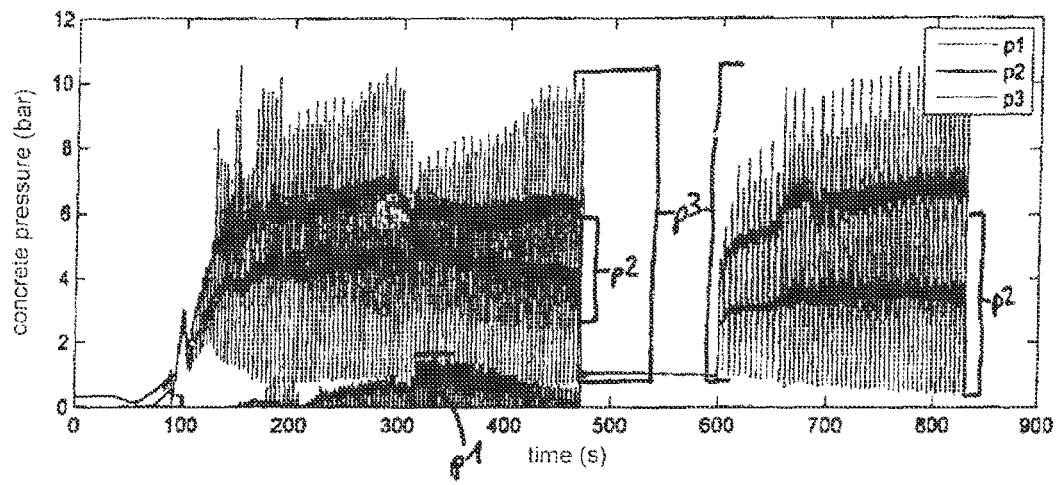
FIG. 1 shows a diagram with raw measurement data concerning the concrete pressure.

FIG. 1 shows a diagram with raw measurement data concerning the concrete pressure which was determined at different points of the delivery tube of the liquid conveying device, here value p1, or of the concrete delivery hose, here values p2 and p3. It can be seen for example that the pressure amplitudes determined with a sensor are greater at the position p2 than at the position p1. Furthermore, the pressure amplitudes at the position p3 are even greater than the two other pressure amplitudes at the positions p1 and p2. Thus, the pressure is higher on average, so that the values are not cut off. Furthermore, it should be noted that the pressure at the position p3 repeatedly decreases, whereas it is maintained at position p2, which is due to the concrete column present in the concrete delivery hose.

Figure 2:
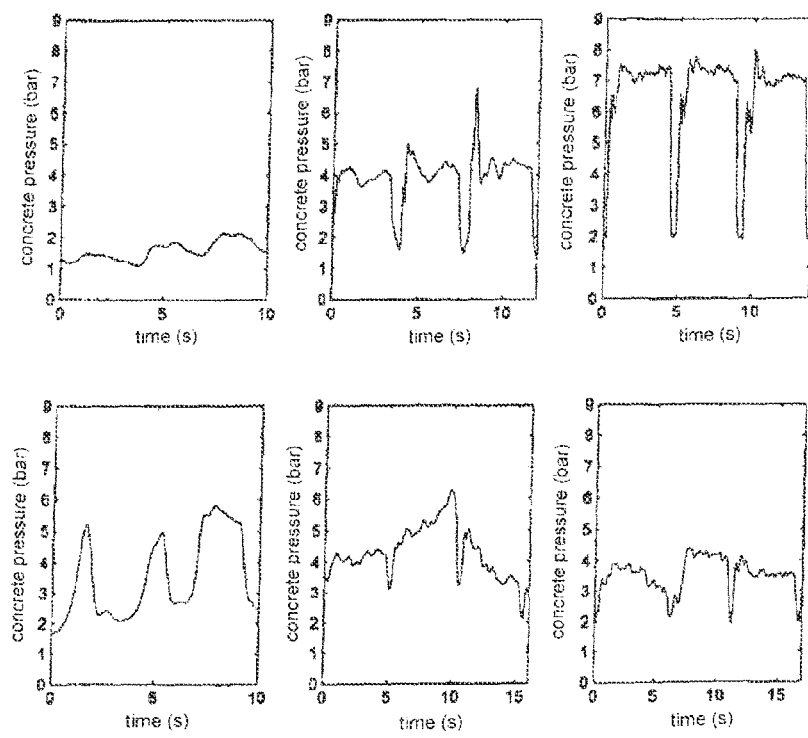
FIG. 2 shows diagrams with pressure signals concerning the concrete pressure.

FIG. 2 shows several diagrams with pressure signals concerning the concrete pressure, from which a further problem can be taken, which arises in the evaluation of the raw measurement data. For example, there are peaks in the pressure signal and it can furthermore be seen that the pump strokes are very different or cause very different signals. It can also be seen that the pump frequency is or can be variable.

The raw measurement data concerning the concrete pressure therefore are evaluated by series connection of a plurality of filters with adaptive filter length and variable detection limits, in order to thereby determine or calculate the number of the pump strokes and then based thereon the delivery rate of the concrete delivered by device of the liquid conveying device.

Figure 3:
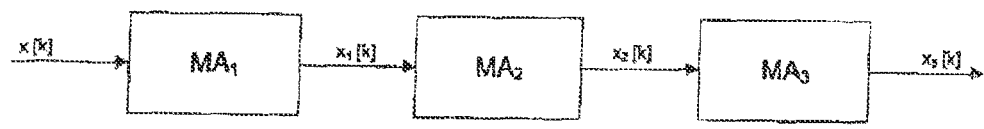
FIG. 3 shows a schematic representation of the MA filter arrangement.
Figure 4:
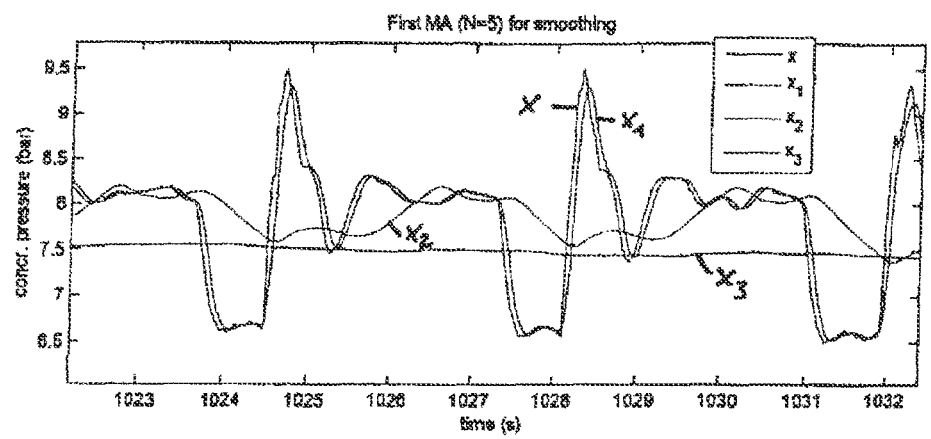
FIG. 4 shows a diagram concerning the mode of operation of the first MA filter.

FIG. 3 shows the filter chain with three MA filters (MA=Moving Averages) MA1, MA2 and MA3. The first MA filter MA1 is a mean value filter over five points for eliminating peaks in the signal or signals x1, x2, x3, as is illustrated in FIG. 4 with reference to a diagram. MA2 and MA3 likewise are mean value filters, wherein MA3 has a filter length in dependence on the pump frequency and MA2 has a filter length which is half of the filter length of MA3. The data is illustrated in the discrete domain, where parameter k represents an index for the current sample, with k-1 representing the most recent past sample, and so on.

Figure 5:
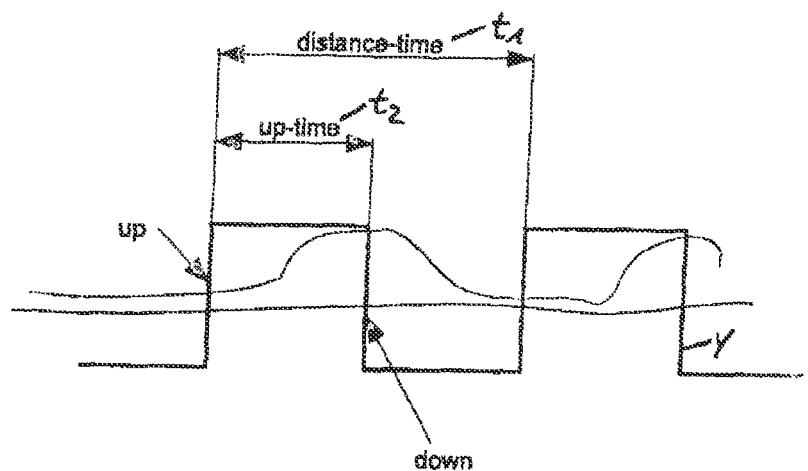
FIG. 5 shows a further diagram concerning windows or filter lengths and fade-out times.

With reference to FIG. 5, the window or filter lengths and fade-out times for generating the square-wave signal y will now be explained. There is formed a mean distance time t1 or a so-called distance time t1, which corresponds to the filter length of MA3. The limits of the mean distance time t1 are dependent on the pump frequency. Furthermore, a mean up-time t2 or a so-called up-time t2 is formed as fade-out time. The limits for the mean up-time t2 are dependent on the pump frequency. A pressure increase only is detected after about 75% of the mean distance time t1 and about 95% of the minimum up-time t2. Furthermore, a pressure decrease only is detected after 75% of the mean up-time t2.

There are also provided variable detection limits, because it is not sufficient to set x1 >x2 or x1<x3 as limits. Therefore, detection limits ub and db are introduced, so that it applies:

$x1 > x2 + ub$ or $x1 < x3 - db$.

Wherein:

$$ub=(x1-x2)/2$$

upon detection of a pressure increase, and $$db=(x3-x1)/2$$

upon detection of a pressure decrease. Minimum and maximum limits for ub and db, respectively, can be specified.

Figure 6:
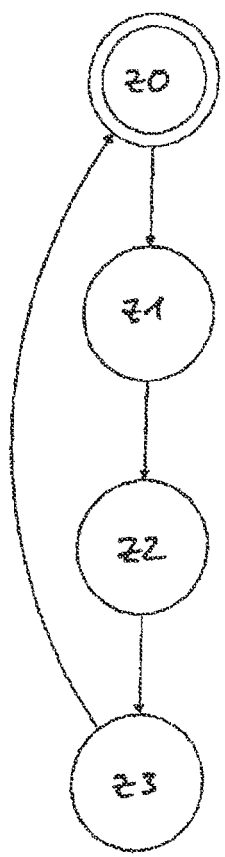
FIG. 6 shows a schematic overall representation of the algorithm for evaluating the detected measured values.

FIG. 6 in summary shows a schematic overall representation of the algorithm for evaluating the detected measured values. In the state 0 Z0 it is waited, until 75% of the mean distance time t1 (cf. FIG. 5) are reached. In the state 1 Z1 a detection of the pressure increase is effected, wherein an adaptation of the mean distance time is effected as well as an adaptation of the window length for MA2 and MA3. In addition, the first detection limit is adapted (upwards) and the procedure goes on to state 2 Z2. In state 2 Z2 it is waited, until 75% of the mean plateau phase, i.e. 75% of the mean up-time t2 (cf. FIG. 5) are reached. Then, the procedure goes on to state 3 Z3. In state 3 Z3 a pressure decrease is detected and the count of the pump strokes is increased by one, when the pump stroke was recognized as valid. The mean plateau phase then is adapted and the second detection limit is adapted (downwards). Then, the procedure again goes on to state 0 Z0.

A calculation of the new mean values advantageously only is effected when the new value lies within a plausible deviation. Moreover, a maximum change of the calculated mean values for example is limited. If the distance is greater than the maximum distance, a reset of the algorithm is effected. If the mean pressure is lower than a specified threshold, the algorithm preferably is deactivated. Furthermore, an examination routine preferably exists, which prevents the algorithm from adapting to double the frequency.

Figure 7:
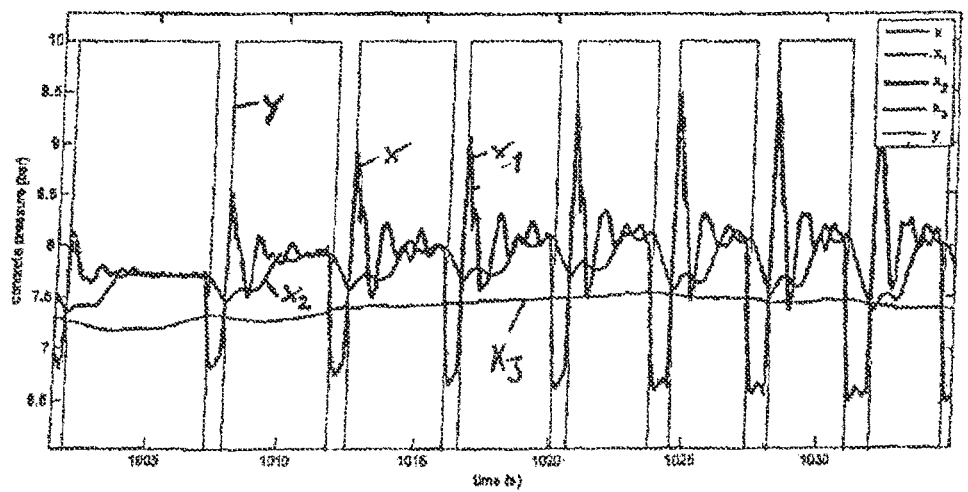
FIG. 7 shows an exemplary extract of the signals along with the conversion into a square-wave signal.

FIG. 7 shows an exemplary extract of the signals x1, x2, x3 and y. The square-wave signal y describes the pump strokes, and with reference to this signal y the pump strokes performed are easy to read. This extract of the signals is obtained by the filter chain shown in FIG. 3, and the resultant signal curves are plotted in the time/concrete pressure diagram with the time indicated in seconds and the concrete pressure indicated in bar after having made an adaptation, i.e., when pumping is effected more or less constantly. Due to the adaptive filter length of the individual MA filters (Moving Averages), the evaluation of the individual filtered signals x1, x2 and x3—wherein the signal curves of the signals x and x1 substantially overlap in the diagram—very well provides for converting the dominant signal frequency into a square-wave signal y, so that the detection of a pump stroke can be effected in the form of a flank, or edge, detection.

Figure 8:
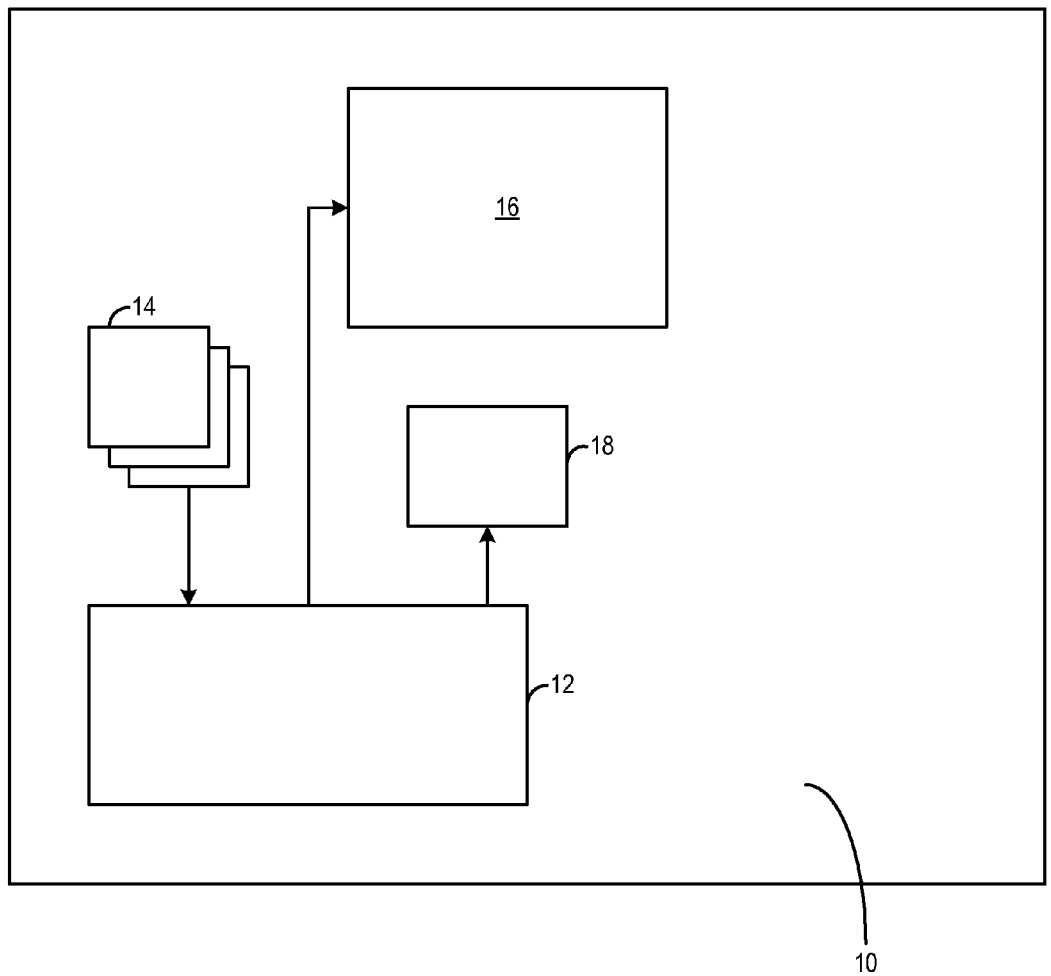
FIG. 8 shows an exemplary system configuration.

FIG. 8 shows an example construction machine 10 including an electronic controller 12 having non-transitory computer readable storage media therein with instructions encoded thereon. The instructions may include code corresponding to the various filters, calculations, and determinations described above herein. The controller 12 may output indications of the calculations and determinations via a display 18. The controller also receives sensor inputs from sensors 14, such as the various sensor described above herein and coupled to concrete pump 16 on the machine 10.

The invention claimed is:

1. A method for determining a delivery rate of a liquid conveying device, wherein the liquid conveying device includes at least one piston pump, comprising:
on the basis of measured values concerning a pressure of liquid in the piston pump, a number of pump strokes of the liquid conveying device is determined by series connection of a plurality of filters with adaptive filter length and variable detection limits.

2. The method according to claim 1, wherein the determination of the delivery rate is effected independent of a DC component of the measured values and/or with highly noisy and/or disturbed and/or shifted measured values and/or without prior knowledge of and/or reference to a current pump frequency of the liquid conveying device, and wherein the liquid conveying device is a concrete pump.

3. The method according to claim 2, wherein at least three filters are provided, the filters being moving-average filters (MA filters), by which an evaluation of individual filtered signals is effected and a dominant signal frequency is converted into a square-wave signal, so that detection of a pump stroke of the liquid conveying device is effected in the form of a flank detection.

4. The method according to claim 3, wherein at least the first MA filter is a mean value filter over at least five measured values for eliminating peaks, at least the third MA filter is a mean value filter whose filter length is dependent on a pump frequency of the piston pump, and at least the second MA filter is a mean value filter whose filter length is half as long as the third MA filter.

5. The method according to claim 2, wherein evaluation of the measured values includes forming at least one mean fade-out time, wherein limits for the mean fade-out time are dependent on a pump frequency of the piston pump.

6. The method according to claim 5, further comprising providing a distance time, which describes a period between two ascending flanks of a square-wave signal, wherein a pressure increase only is detected after 75% of a mean distance time and 95% of a minimum fade-out time and/or that a pressure decrease only is detected after 75% of the mean fade-out time (t2).

7. A liquid conveying device, the device being a piston pump for delivering concrete, with at least one device for determining a delivery rate of the liquid conveying device, wherein on the basis of measured values concerning a pressure of liquid in the liquid conveying device, a number of pump strokes of the piston pump is determined by filters with a series connection, the filters having an adaptive filter length and variable detection limits.

8. The device of claim 7 coupled in a construction machine.

9. A method for determining a delivery rate of a liquid conveying device, wherein the liquid conveying device includes at least one piston pump, comprising:
measuring delivery pressure of a liquid in the piston pump; and
filtering the measured pressure with a plurality of digital filters, serially implemented, to convert the measured pressure into a square wave, the filters having an adaptive filter length and variable detection limits; and
determining a number of pump strokes of the device based on flank detection of the square wave.

10. The method according to claim 9, further comprising determining the delivery rate based on the number of pump strokes and an amount delivered per pump stroke.

11. The method according to claim 10, wherein the liquid conveying device is a concrete pump, and wherein the determination of the delivery rate is effected independent of a DC component of a measured value and with highly noisy and disturbed and shifted measured values and without prior knowledge of and reference to a current pump frequency of the liquid conveying device.

* * * * *